UNITED STATES PATENT OFFICE.

MAX BAZLEN, OF LUDWIGSHAFEN, GERMANY, ASSIGNOR TO THE BADISCHE ANILIN & SODA FABRIK, OF LUDWIGSHAFEN, GERMANY, A CORPORATION OF GERMANY.

SOLID ALKALINE HYDROSULFITES AND PROCESS OF MAKING SAME.

SPECIFICATION forming part of Letters Patent No. 711,377, dated October 14, 1902.

Application filed December 20, 1899. Serial No. 740,987. (No specimens.)

*To all whom it may concern:*

Be it known that I, MAX BAZLEN, a doctor of philosophy, and a subject of the King of Würtemberg, residing at Ludwigshafen-on-the-Rhine, in the Kingdom of Bavaria, Germany, have invented new and useful Improvements in Solid Alkaline Hydrosulfites and Processes of Making the Same, of which the following is a specification.

In the art of indigo-dyeing the need has long been felt of a chemical indigo-reducer which could be handled and dealt in as a commercial product all ready made and adapted for the efficient reduction of the indigo upon being placed in the vat by the dyer. In the prior art alkali hydrosulfites, more especially sodium hydrosulfite, were extensively used. They were prepared at the time and place of using and then only in solution, with the concurrent formation of objectionable insoluble bodies, such as zinc and its compounds. Moreover, this solution contained in addition to the hydrosulfite at least about an equal quantity of other alkaline salts, such as sulfites, sulfates, thiosulfates, &c. I believe that there was no technical method or process known for the production of alkali hydrosulfite of any kind in any state other than solution. All attempts to produce or obtain from hydrosulfite solutions a solid material were, I believe, in the first place, merely laboratory experiments, and, in the second place, the solid obtained was according to the literature so unstable and impure that its advantageous application in the arts was an impossibility.

I have discovered a process, which is the subject of my application, Serial No. 740,986, dated December 20, 1899, by which I produce a new hydrosulfite, which in my application, Serial No. 740,988, dated December 20, 1899, is claimed generically and also specifically in solution. In addition to obtaining said new hydrosulfite in solution I have discovered a means whereby I can obtain the same in the form of a substantially dry solid which is sufficiently stable so that it can be handled, transported, and dealt in commercially in closed metallic vessels and also sufficiently stable so that when removed from said vessels it can be exposed to the air long enough for the necessities of use and which when used possesses great efficiency. The means by which I produce this solid hydrosulfite from the solution is based on the discovery that alkali salts of hydrosulfurous acid possess the property peculiar in inorganic chemistry of being precipitated from their solutions by means of common salt. By applying this new process to a solution of said new hydrosulfite of proper strength I obtain a solid alkali hydrosulfite which can be dried and which when properly dried is stable on exposure to air for days at a time, while if kept in closed vessels will remain practically unaltered for months and is practically free from zinc.

The following examples will serve to illustrate the manner in which my new product can be made.

Example 1: In order to produce a highly-concentrated hydrosulfite solution, mix together about twenty-eight and four-fifths ($28\frac{4}{5}$) kilograms of sodium bisulfite of about 40° Baumé density and thirty-four and one-half ($34\frac{1}{2}$) kilograms of concentrated aqueous solution of sulfur dioxid (containing about ten per cent. $SO_2$) or prepare a similar solution by diluting the sodium-bisulfite solution with about thirty-one (31) liters of water and causing it to absorb the corresponding quantity of gaseous sulfur dioxid. To the solution obtained in either of the ways described add, gradually, about four and four-fifths ($4\frac{4}{5}$) kilograms of zinc-dust. During this addition keep the solution at a temperature between 30° and 40° centigrade by suitably cooling. When all the zinc-dust has been added, stir for some time and then allow the mixture to stand for an hour or two. Precipitate the zinc oxid with milk of lime, prepared from four and four-fifths ($4\frac{4}{5}$) parts of quicklime and sixteen (16) liters of water and filter.

When proceeding as hereinbefore described, one obtains a solution of the neutral sodium hydrosulfite, of which ten kilos are sufficient to reduce just under two kilograms of one hundred per cent. indigo. Now heat the said solution in a closed vessel to about 50° or 60° centigrade. Then add twenty-four (24) kilograms of common salt. Stir until the salt is entirely dissolved and allow to cool. The precipitation of the solid hydrosulfite begins at once. When no further quantity separates out, collect by filtration and dry.

Example 2: Prepare one hundred (100) parts of a solution of ammonium hydrosulfite of such strength that about eight parts are sufficient to reduce one part of indigo. Heat this solution to 50° centigrade and add about twenty-six (26) parts of common salt while stirring well. Allow to cool, collect the hydrosulfite which separates out by filtering, and dry.

The operations of filtering and drying in both the examples should be conducted as far as possible in the absence of air.

In the foregoing examples I have described the use of sodium and ammonium bisulfites and the production of sodium and ammonium hydrosulfites. If potassium bisulfites be used instead of these bisulfites, then the potassium hydrosulfites that I also desire to include generically in this application are obtained.

In addition to the characteristics of my new product above set forth I may mention the following: Its solution in water combines a low specific gravity with high reducing power, so that with a density of, say, 16° Baumé, say seven and one-half liters or less of the solution are sufficient to reduce one kilogram of pure indigo, or, in other words, one hundred cubic centimeters of a 17° Baumé solution contain nine grams or more of alkali hydrosulfite. My new product is substantially non-changeable under commercial conditions for a reasonable length of time and can therefore be made in advance of its use and if need be transported and dealt in as an article of commerce ready for immediate use as an already-formed reducing agent, being sold in closed metallic packages. On exposure to the air it slowly oxidizes, and the smell of sulfur dioxid can be observed, but so slowly that for use as a reducer of indigo it practically remains unchanged for twenty-four (24) hours in dry air at seventeen (17°) degrees centigrade. In contact with the air in a moist state a rather rapid oxidation takes place, so that the mass becomes warm, while sulfur dioxid is driven off.

The new product decolorizes a solution of indigo sulfo-acid immediately, and on warming with indigo and caustic-soda solution an indigo-vat is obtained.

My sodium hydrosulfite by slowly crystallizing from its solution can be obtained in prismatic crystals which have a strong refractive action on the light. It is chemically the neutral salt of the alkali. The purified salt possesses a composition corresponding to the formula $Na_2S_2O_4+2H_2O$. Upon heating to 110° centigrade the salt loses its water of crystallization. Upon titrating the purified salt with indigo sulfo-acid in aqueous solution it can be ascertained to contain about eighty-two per cent. $Na_2S_2O_4$. Upon heating it melts, and at a red heat it burns with a bluish flame, emitting sulfur dioxid. The determination of the reducing capacity of a specimen of the product against sulfonated indigo, which is to be carried out in the absence of air, showed that the specimen contained 99.5 per cent. $Na_2S_2O_4+2H_2O$, (one molecule indigo, equaling two hundred and sixty-two parts, being equivalent to one molecule $Na_2S_2O_4+2H_2O$, equaling two hundred and ten parts.)

Now what I claim is—

1. As a new article of manufacture a substantially dry solid alkali hydrosulfite which will remain practically unchanged for twenty-four (24) hours when exposed to dry air at seventeen (17°) degrees centigrade and for a month when kept in a closed vessel at seventeen (17°) degrees centigrade and which upon slowly crystallizing from its solution in water produces prismatic crystals which have a refractive action on light.

2. The new soluble solid alkali hydrosulfite which contains water of crystallization which can be dried, which remains practically unchanged for twenty-four (24) hours when exposed in the dry state to dry air at seventeen (17°) degrees centigrade, and for a month when kept in the dry state in a closed vessel at seventeen (17°) degrees centigrade, and one hundred cubic centimeters of a 17° Baumé solution of which in water contain nine grams or more of alkali hydrosulfite, as shown by its reducing capacity for indigo.

3. The process of producing a solid alkali hydrosulfite which consists in adding sodium chlorid to a solution of the same.

In testimony whereof I have hereunto set my hand in the presence of two subscribing witnesses.

MAX BAZLEN.

Witnesses:
ERNEST G. EHRHARDT,
JULIUS ABEL.